United States Patent Office 3,019,214
Patented Jan. 30, 1962

3,019,214
ETHYLENE POLYMERISATION
Andrzej Pajaczkowski, Harpenden, England, assignor to Imperial Chemical Industries Limited, London, England, a corporation of Great Britain
No Drawing. Filed Dec. 5, 1960, Ser. No. 73,486
Claims priority, application Great Britain Feb. 14, 1958
10 Claims. (Cl. 260—94.9)

This invention relates to improvements in processes for the polymerization of ethylene to yield solid or semi-solid polymers, and particularly to new catalysts, or initiators, for the polymerization process at high pressures. The application is a continuation-in-part of copending application, S.N. 791,285, filed February 5, 1959, and now abandoned.

In U.S. specification No. 2,865,904 is described a process for the manufacture of solid polymers of ethylene characterised in that ethylene is subjected to pressures greater than 500 atmospheres and to temperatures above 10° C. in the presence of a catalyst chosen from the group consisting of alpha-substituted acyl peroxides having the general formula A.CXY.CO.O.O.CO.CXY.A, wherein A, X and Y are alkyl, alkoxy or aryl groups and may be similar or dissimilar, where A, but X or Y, may also be hydrogen, and where X and Y may together form a cyclo-aliphatic ring. It is stated that for a given rate of reaction the alpha-substituted acyl peroxides enable the polymerization to be carried on at temperatures substantially lower than those used for previously known catalysts; or, alternatively, for a given reaction temperature the alpha-substituted acyl peroxides enable the reaction to proceed at much higher rates.

We have now found that certain acyl peroxides in which the acyl radicals contain side chains or cyclo-aliphatic groups attached to a carbon atom other than the alpha carbon atom of the acyl radical are also powerful initiators for the polymerization, and that they have other properties that make them particularly useful as catalysts for the production of ethylene polymers or interpolymers.

The present invention comprises, in a process for the production of ethylene polymers by polymerizing ethylene at an elevated pressure, the improvement that comprises carrying out said polymerization in the presence of an acyl peroxide selected from the group consisting of 3,5,5-trimethylhexanoyl peroxide, isovaleryl peroxide and mixtures of naphthenyl peroxides, said polymerization being carried out at a temperature between 90° C. and 250° C. and at a pressure between 1,000 and 3,000 atmospheres.

We have found that, in addition to their high efficiency as ethylene polymerization initiators, these acyl peroxides have a number of other advantages over unbranched acyl peroxides for use as polymerization initiators. Thus, they combine in themselves the useful properties of being soluble in suitable inert solvents, such as high-boiling aliphatic hydrocarbons; of being non-explosive, and therefore easily and safely introduced into the reaction vessel; and of having improved freedom from odour. In normal, or unbranched, acyl peroxides an improvement in any of these properties is obtainable only at the expense of a simultaneous deterioration in another of them. For example, lower acyl peroxides such as propionyl or butyryl peroxides are soluble liquids but are explosive when subjected to thermal or mechanical shock. Unbranched acyl peroxides of higher molecular weight, such as lauroyl or capryl peroxides, are non-explosive but must be heated to temperatures above their melting points in order to be dissolved, and maintained in solution, in high-boiling hydrocarbons. Such heating results in partial deterioration of the peroxide, and accidental cooling of the solution can result in solid peroxide crystallising out and blocking the initiator injection system. A further disadvantage of most normal acyl peroxides is the odour associated with them and particularly with their decomposition products, the odour thus being intensified in solid acyl peroxide initiators when partial decomposition occurs during the dissolving process.

The peroxides used in the process of this invention can be prepared from the corresponding branched carboxylic acids (for example such as are obtainable by the oxidation by branched alcohols or aldehydes synthetically produced by the oxo hydroformylation process) by any of several well known chemical methods, for example by converting the acid to its chloride and reacting the latter with hydrogen peroxide in the presence of a base.

In ethylene polymerization with a branched acyl peroxide as initiator the choice of reaction conditions is governed by various factors, for example the desired rate of reaction or the desired molecular weight or density of the polymer. For ease of operation, pressures between 1,000 and 2,000 atmospheres are generally preferred, and operation at temperatures of from 90° to 250° C. gives the advantage that particularly high rates of reaction are obtained. Operation at pressures between 2,000 and 3,000, if convenient, may be used to obtain the favourable effect of increased pressure on the rate of polymerization.

The polymerization may be carried out in the presence of chain-transfer agents, for example hydrogen, carbon tetrachloride, propylene, cyclohexane, ethane, propane. Monomers with which ethylene can be interpolymerized include other monoethenoid hydrocarbons, for example styrene, propylene, isobutylene, pentenes; esters of unsaturated acids, for example diethyl fumarate, methyl methacrylate; vinyl esters, for example vinyl acetate.

The invention is illustrated but not restricted by the following examples, in which parts given are by weight unless otherwise stated. Examples 2 to 5 describe batch processes for the polymerization of ethylene and it will be appreciated that different conditions are required for corresponding continuous polymerization processes; for example, much higher temperatures are used.

*Example 1*

To a mixture of 17 vols. of 3,5,5-trimethylhexanoyl chloride and 8 vols. of 100-volume hydrogen peroxide cooled to 0° C. were added in small portions and with constant stirring and cooling 8 vols. of pyridine. After the addition was complete, the mixture was stirred for 1 hours at 0° C. The organic layer was separated, washed with water and with a solution of sodium bicarbonate, diluted with ether and dried over anhydrous calcium chloride. Ether was removed; the residue (11 vols.) was a liquid of refractive index ($n_D^{20}$) 1.4382, had an infrared spectrum showing it to consist principally of 3,5,5-trimethylhexanoyl peroxide (carbonyl absorption at 1818 and 1785 cm.$^{-1}$), liberated iodine from acidified aqueous potassium iodide, and evolved gas on being heated to 95° to 115° C.

The peroxide did not freeze when cooled to −70° C., was miscible with liquid paraffin and did not separate from solution in it when cooled to −70° C., did not explode or detonate when subjected to thermal or mechanical shock, and possessed only a faint and inoffensive odour quite unlike that associated with normay acyl peroxides.

*Example 2*

0.25 ml. of a solution containing 50 grams per litre of 3,5,5-trimethylhexanoyl peroxide in white spirit was placed in a high-pressure autoclave. The autoclave was closed and the contained air swept out with oxygen-free ethylene. Oxygen-free ethylene was then injected into the autoclave up to a pressure of 1,400 atmospheres and heat was applied so as to raise the internal temperature to 90° C. After a few minutes the pressure of the contents began to fall and was repeatedly brough back to 1,400 atmospheres by injecting an appropriate additional quantity of ethylene. When the cumulative fall of pressure reached 100 atmospheres, the unreacted ethylene was allowed to escape and the autoclave was cooled and opened. It was found to contain 5.2 grams of white polythene powder.

*Example 3*

352 parts of sodium hydroxide were dissolved in 3,500 parts of water and the solution was cooled to 0° C. To it were added 454 parts of 100-volume hydrogen peroxide while the temperature was kept below 5° C. The mixture was stirred rapidly, and was cooled to −5° C. while 970 parts of isovaleryl chloride were added during half an hour. After being stirred for a further hour, the reaction mixture was diluted with pentane and the organic layer was separated and dried. Peroxidic oxygen contained by the pentane solution and estimated iodometrically was equivalent to a concentration of 142 grams of isovaleryl peroxide per litre. The infra-red absorption spectrum of the solution showed that it contained an acyl peroxide (bands at 1812 and 1785 cm.$^{-1}$) and no other carbonyl compounds. The residue obtained after removal of the pentane was a liquid that froze and melted at −51° C. to −48° C., did not detonate when subjected to thermal or mechanical shock, and contained 7.2% of peroxidic oxygen (calculated for isovaleryl peroxide, 7.9%). A mixture of 61 parts of the isovaleryl peroxide and 39 parts of liquid paraffin remained homogeneous when cooled to −18° C., and a mixture of 46 parts of the isovaleryl peroxide and 54 parts of white spirit remained homogeneous at −60° C.

When 0.085 ml. of a solution containing 140 grams of isovaleryl peroxide per litre of pentane was tested for initiating activity at 100° C. in ethylene compressed to 1000 atm., in an experiment similar to that described in Example 2, 6.5 grams of powdery polythene were produced.

*Example 4*

80 vols. of 100-volume hydrogen peroxide, 79 vols. of pyridine and 244 vols. of naphthenyl chloride (containing 15.0% Cl and prepared by refluxing mixed naphthenic acids, of acid equivalent 226, with thionyl chloride and distilling the product under reduced pressure) were used in a preparation similar to that described in Example 1. In pentane solution the product showed infra-red absorption bands at 1818 and 1789 cm.$^{-1}$ and liberated iodine from acidified potassium iodide. The concentrated peroxide had $n_D^{20}$ 1.4824 and did not crystallise when cooled at −70° C. It did not detonate on being subjected to thermal or mechanical shock. The acid equivalent, determined by titration in alcoholic solution, was 216; the infra-red spectrum showed that no free naphthenic acids were present.

When 0.25 ml. of a solution containing 78 grams of the naphthenyl peroxide per litre of white spirit was tested for initiating activity at 100° C. in ethylene compressed to 1,000 atm. in an experiment similar to that described in Example 2, 6.6 grams of polythene were produced.

*Example 5*

Into a stainless steel high-pressure reactor of capacity 62 ml. was put 0.25 ml. of a solution containing 1 g. of 3,5,5-trimethylhexanoyl peroxide per 100 ml. of paraffin oil. The reactor was closed and the enclosed air was repeatedly swept out with oxygen-free ethylene gas. The reactor was charged with oxygen-free ethylene up to a pressure of 2,500 atmospheres and heated under pressure to 80° C. After 78 minutes the internal pressure had dropped by 90 atmospheres. When the reactor was cooled and reopened, 2.2 g. of solid, white polythene were obtained.

I claim:
1. In a process for the production of ethylene polymers by polymerizing ethylene at an elevated pressure, the improvement that comprises carrying out said polymerization in the presence of an acyl peroxide selected from the group consisting of 3,5,5-trimethylhexanoyl peroxide, isovaleryl peroxide and mixtures of naphthenyl peroxides, said polymerization being carried out at a temperature between 90° C. and 250° C. and at a pressure between 1,000 and 3,000 atmospheres.
2. In a process for the production of ethylene polymers by polymerizing ethylene at an elevated pressure, the improvement that comprises carrying out said polymerization in the presence of an acyl peroxide selected from the group consisting of 3,5,5-trimethylhexanoyl peroxide, isovaleryl peroxide and mixtures of naphthenyl peroxides, said polymerization being carried out at a temperature between 90° C. and 250° C. and at a pressure between 1,000 and 2,000 atmospheres.
3. A process as claimed in claim 1 in which the acyl peroxide is 3,5,5-trimethylhexanoyl peroxide.
4. A process as claimed in claim 2 in which the acyl peroxide is 3,5,5-trimethylhexanoyl peroxide.
5. A process as claimed in claim 1 in which the acyl peroxide is isovaleryl peroxide.
6. A process as claimed in claim 2 in which the acyl peroxide is isovaleryl peroxide.
7. A process as claimed in claim 1 in which the acyl peroxide is a mixture of naphthenyl peroxides.
8. A process as claimed in claim 2 in which the acyl peroxide is a mixture of naphthenyl peroxides.
9. A process as claimed in claim 1 in which the ethylene is polymerized in the presence of a chain transfer agent.
10. A process as claimed in claim 2 in which the ethylene is polymerized in the presence of a chain transfer agent.

References Cited in the file of this patent
UNITED STATES PATENTS
2,865,904    Seed et al. _____ Dec. 23, 1958

OTHER REFERENCES
Journal of the Chemical Society (W. Cooper), November 1951, pages 3106–3113.